United States Patent
Hu et al.

(10) Patent No.: US 9,320,060 B2
(45) Date of Patent: Apr. 19, 2016

(54) METHOD, DEVICES AND SYSTEM FOR LOCAL COLLISION AVOIDANCE FOR RANDOM ACCESS IN RELAY NETWORKS

(75) Inventors: Honglin Hu, Shanghai (CN); Haifeng Wang, Shanghai (CN); Ping Zhou, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 167 days.

(21) Appl. No.: 12/922,515

(22) PCT Filed: Mar. 14, 2008

(86) PCT No.: PCT/EP2008/053105
§ 371 (c)(1),
(2), (4) Date: Oct. 12, 2010

(87) PCT Pub. No.: WO2009/112080
PCT Pub. Date: Sep. 17, 2009

(65) Prior Publication Data
US 2011/0026409 A1    Feb. 3, 2011

(51) Int. Cl.
*H04L 12/413* (2006.01)
*H04L 12/26* (2006.01)
*H04W 74/08* (2009.01)
(Continued)

(52) U.S. Cl.
CPC ......... *H04W 74/0841* (2013.01); *H04L 1/1867* (2013.01); *H04W 88/04* (2013.01)

(58) Field of Classification Search
CPC ...... H04L 63/12; H04L 63/0442; H04L 67/40
USPC .................. 370/243, 445, 310, 338; 455/11.1
See application file for complete search history.

(56) References Cited

U.S. PATENT DOCUMENTS

| 2002/0187746 A1 | 12/2002 | Cheng et al. .................. 455/11.1 |
| 2005/0237956 A1 | 10/2005 | Kuperschmidt et al. ...... 370/310 |
| 2006/0256746 A1* | 11/2006 | Quick et al. .................. 370/315 |

(Continued)

FOREIGN PATENT DOCUMENTS

| CN | 1838574 A | 9/2006 |
| CN | 1849758 A | 10/2006 |

(Continued)

OTHER PUBLICATIONS

Hitichi, Hitichi H8-3644 hardware manual, Rev.6.00, Sep. 2006.*

(Continued)

*Primary Examiner* — Andrew Lai
*Assistant Examiner* — Albert Shih
(74) *Attorney, Agent, or Firm* — Harrington & Smith

(57) ABSTRACT

An apparatus such as a user equipment is in an embodiment of the invention configured to broadcast an access request to at least one neighboring node, the access request containing signature information indicating a user identifier, to check whether a collision indicator is received from a relay node, and to send another access request depending on a received collision indicator. The collision indicator may e.g. be a signature collision indicator, received from the node in case of colliding users, or a collision indicator of transmission received when transmissions of access requests are colliding at the node. A relay node may be configured to receive an access request from a user equipment, to detect a collision, and to inform the user equipment on a detected collision, indicating a type of collision.

17 Claims, 5 Drawing Sheets

(51) Int. Cl.
*H04L 1/18* (2006.01)
*H04W 88/04* (2009.01)

(56) References Cited

U.S. PATENT DOCUMENTS

| | | | |
|---|---|---|---|
| 2006/0268797 A1 | 11/2006 | Cheng et al. | 370/338 |
| 2008/0192766 A1* | 8/2008 | Ranta-Aho et al. | 370/445 |
| 2010/0172299 A1* | 7/2010 | Fischer et al. | 370/328 |
| 2010/0217990 A1* | 8/2010 | Abe et al. | 713/176 |

FOREIGN PATENT DOCUMENTS

| | | |
|---|---|---|
| CN | 1878120 A | 12/2006 |
| CN | 101039526 A | 9/2007 |
| WO | WO 2005/015774 A1 | 2/2005 |

OTHER PUBLICATIONS

China, Chinese Patent Office 3rd rejection for related chinese applciation publication No. CN 102027797A, Mar. 27, 2014.*

* cited by examiner

METHOD, DEVICES AND SYSTEM FOR LOCAL COLLISION AVOIDANCE FOR RANDOM ACCESS IN RELAY NETWORKS

FIELD OF TECHNOLOGY AND BACKGROUND

Current or future wireless networks, such as beyond 3G mobile radio system, may require considerably large coverage areas and high data rate. A relay network may be employed for current and future demands. Incorporating fixed or mobile relays in the network may e.g. be a modification in the wireless network architecture to meet desired high throughput and coverage requirements for actual or future application. In relay networks, a relay node, RN, is provided which forwards data or signalling from a source node, SN, to a destination node, DN, which is out of reach of the SN.

Random access protocols are widely used in a cellular network for initial access, bandwidth request, location update, etc. However, random access schemes may have problems regarding user collision which reduces the throughput. Moreover, the collision may also result in an uncontrollable access delay which makes it difficult to meet quality of service, QoS, requirement for an attempted user.

In a cooperative network, user collision may become problematic when a random access is relayed to a base station, BS, because the collision consumes not only resources of the random access channel in the system but also causes high overhead of the link establishment between the source user and the relay node during the initial random access. Furthermore, the access delay may become uncontrollable if the user needs to re-establish the communication with the relay node before retransmission. Therefore, it is desirable to reduce user collision in the relaying network and the number of unnecessary retransmission for the random access should also be minimized.

SUMMARY

Embodiments of the invention provide methods, devices, apparatuses, and system as defined in the claims, description or drawings. Embodiments of the methods, devices, apparatuses, and system provide for local collision avoidance for random access in one or more networks such as relay networks.

In accordance with one, more or all of the embodiments of the invention, a collision-aware or awareness scheme on random access in a network such as a relaying network is provided. Embodiments exploit the capability of overhearing on one or more relay nodes, RNs, so as to monitor a potential user collision from neighbourhood or adjacent users if their access requests, AR, need relaying.

Thereby, an access collision from local users at or in a base station, BS can be avoided.

In one or more embodiments of the invention, information of a user signature is contained in an access request when it is broadcasted by an attempted user. An attempted user is a user or user equipment requesting access to the access network such as a radio network, e.g. by sending an access request to a base station or a relay node. Therefore, by overhearing the request probing or sent access requests, a relay node RN can collect signature information of nearby attempted users. Hence, a user collision can be discovered as soon as a signature collision is detected by the RN. As a result, a collision can be prevented before an access request AR is relayed to the base station, BS.

Moreover, to further enhance the reliability of response feedback from the relay node, RN, a priority of a request response is provided. So an adaptive transmission of the response can be employed, such as bandwidth adaptation, etc.

One or more embodiments of the invention can be applied to, or use, one or more protocols of random access in the network or relaying network.

In accordance with an embodiment of the invention, an apparatus is configured to:
broadcast an access request to at least one neighboring node, the access request containing signature information indicating a user identifier,
detect a collision indicator received from the apparatus or relay node,
check the received collision indicator, and
send another access request depending on the received collision indicator.

The apparatus may e.g. be configured as a user equipment, mobile node, terminal, or a part, chip, module, software of or for a user equipment.

The collision indicator may be at least one of a signature collision indicator, received from the node in case of colliding users, and a signature collision indicator received after the apparatus the access request has successfully been sent to the node, a collision indicator of transmission received when transmissions of access requests are colliding at the node.

The apparatus may e.g. be configured to select a node in case response messages are received from more than one node in response to the access request, and/or may be configured to generate the signature information on a random basis.

The apparatus may be configured to first check whether a received collision indicator is a signature collision indicator, then check whether the received response is a request success response, and then check whether the collision indicator is a transmission collision indicator, a response generated by the apparatus depending on the received response.

The apparatus may be configured to at least one of:
re-select a signature information when detecting a signature collision indicator, and to broadcast another access request comprising the reselected signature information;
in case of signature collision, send a failure information;
select a node when a response received by the apparatus includes more than one node identifiers of two or more nodes,
broadcast a message containing information on the selected node,
send additional content such as an access cause, priority, bandwidth request,
send a preamble separated from a message, and
send a preamble combined with the message.
broadcast the access request again after a backoff or delay time in case of transmission collision;
broadcast the access request again without backoff or delay time in case no response is received to the access request,
increase transmission power during the retransmission.

In accordance with an embodiment of the invention, an apparatus such as a relay node, or a part, chip, module, software of or for a relay node, may be configured to receive an access request from a user equipment, to detect a collision, and to inform the user equipment on a detected collision, indicating a type of collision.

The apparatus may be configured to at least one of:
monitoring receipt or detection of at least one other access request,
checking whether a type of collision such as signature collision,
selecting an identifier of the apparatus,
selecting an identifier of the apparatus on a random basis, sending the identifier to the user equipment,
sending a request success message to the user equipment,
starting a timer when sending the request success message,
clearing, i.e. deleting, a signature record maintained in the apparatus when the timer has expired,
checking whether a transmission collision exists,
when detecting a transmission collision, sending a transmission collision indicator to the user equipment,
checking whether a signature collision exists,
when detecting a signature collision, sending a signature collision indicator to the user equipment,
clearing the signature record of the apparatus,
returning to the monitoring of receipt or detection of at least one other access request,
updating the signature record by including information on the user equipment when detecting an acknowledgement.

According to an embodiment a method may comprise:
broadcasting an access request to at least one neighboring node, the access request containing signature information indicating a user identifier,
detecting a collision indicator received from the apparatus or node,
checking the received collision indicator, and
sending another access request depending on the received collision indicator.

The method may e.g. comprise at least one of:
select a node in case response messages are received from more than one node in response to the access request;
generate a signature information on a random basis;
first check whether a received collision indicator is a signature collision indicator,
then check whether the received response is a request success response, and
then check whether the collision indicator is a transmission collision indicator, a response generated by the apparatus depending on the received response,
re-select a signature information when detecting a signature collision indicator, and to broadcast another access request comprising the reselected signature information;
in case of signature collision, send a failure information;
select a node when a response received includes more than one node identifiers of two or more nodes,
broadcast a message containing information on the selected node,
send additional content such as an access cause, priority, bandwidth request,
send a preamble separated from a message, and
send a preamble combined with the message.
broadcast the access request again after a backoff or delay time in case of transmission collision;
broadcast the access request again without backoff or delay time in case no response is received to the access request,
increase transmission power during the retransmission.

An embodiment of a method may comprise receiving an access request from a user equipment, detecting a collision, informing the user equipment on a detected collision, indicating a type of collision.

An embodiment of the method may comprise at least one of:
monitoring receipt or detection of at least one other access request,
checking a type of collision such as signature collision,
selecting an identifier,
selecting an identifier on a random basis,
sending the identifier to the user equipment,
sending a request success message to the user equipment,
starting a timer when sending the request success message,
clearing a signature record when the timer has expired,
checking whether a transmission collision exists,
when detecting a transmission collision, sending a transmission collision indicator to the user equipment,
checking whether a signature collision exists,
when detecting a signature collision, sending a signature collision indicator to the user equipment,
clearing the signature record,
returning to the monitoring of receipt or detection of at least one other access request,
updating the signature record by including information on the user equipment when detecting an acknowledgement.

In accordance with one or more embodiments of the invention, a computer program product is provided which comprises software code portions for carrying out at least one or more or all of the features of any one of the above method when run on a processor. The computer program product may be embodied on a computer-readable medium.

A system according to an embodiment may comprise at least one user equipment and relay node as described above or below.

Other objects, features and advantages of the invention will become apparent from the following description of embodiments of the invention.

DESCRIPTION OF EMBODIMENTS

Figure 1:
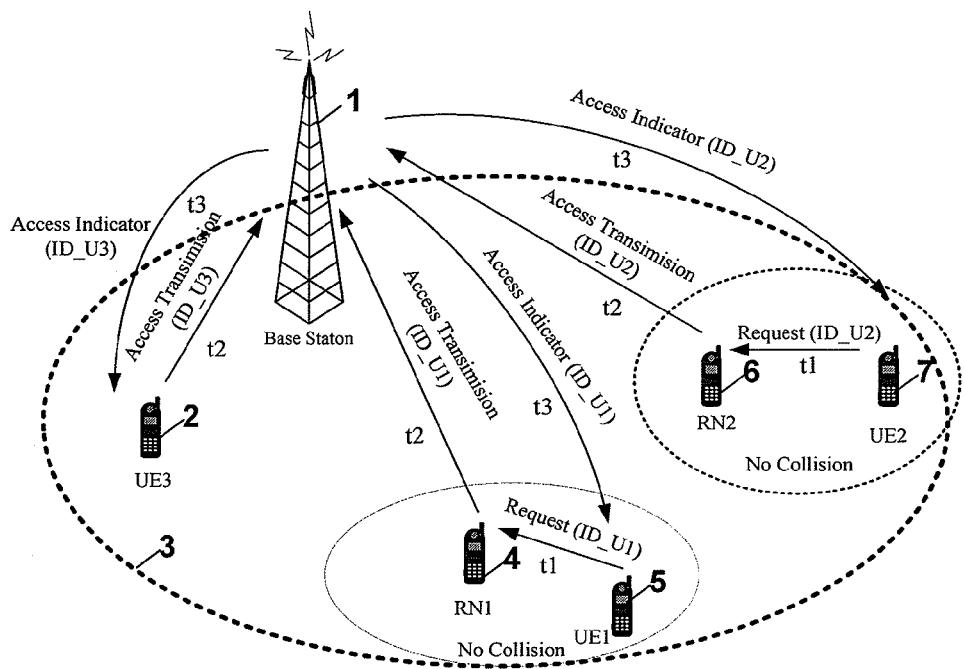
FIG. 1 illustrates an embodiment of a system and apparatuses in accordance with the invention, illustrating a random access in a relay based network.

FIG. 1 illustrates an embodiment of a system, method and apparatuses in accordance with one, more or all of the embodiments of the invention, illustrating a random access in a network such as a relay based network. In the embodiment of FIG. 1, a user equipment 2, UE3, directly sends an access request to a base station 1 of a mobile cellular network comprising one or more cells 3 defined by one or more base stations 1. A device or apparatus 4, e.g. a user equipment, acts as a relay node RN1 to help a user equipment 5, UE1, to access the network or base station.

A device or apparatus 6, e.g. a user equipment, acts as a relay node RN2 to help a user equipment 7, UE2, to access the network or base station.

During random access, an attempted user, that is a user requesting the access, transmits both a preamble and a message. Usually, the preamble is randomly selected indicating information of user signature that denotes a user identifier. The message may contain user specific information, such as bandwidth request, priority, location update, etc. In accordance with one, more or all of the embodiments of the invention, the message transmission can be either separated from or along with the preamble transmission. Embodiments of the invention can be applied to the transmission of the preamble, or to the transmission of the message, or to both of the transmissions of the preamble and the message.

In accordance with one, more or all of the embodiments of the invention, a communication between the attempted user and the RN is defined whereas the scheme or protocol of the access transmission between the RN and the BS is not restricted and any access transmission may be used in accordance with one, more or all of the embodiments of the invention.

In one or more embodiments discussed in the following, a separate mode of access transmission is used in which the preamble is firstly sent on a contention-based random access channel, RACH, and then the user specific message will be transmitted on a scheduled channel after the preamble is successfully detected in the base station, BS.

In a relay based cellular network, the transmission of an access request, AR, can be relayed by the RN when it is difficult to directly transmit the request by the attempted user itself to e.g. a base station.

In a relay based random access in the cellular network, such as shown in the FIG. 1 embodiment, a main procedure can be divided into e.g. three steps as follows:

1.) An access requesting user equipment, e.g. UE1 5 or UE2 7, firstly broadcast an access request "Request (ID_U1)" or "Request (ID_U2)" to the neighboring relay nodes RNs, as indicated at step t1. The access request "Request (ID_U1)" or "Request (ID_U2)" optionally contains an information on the signature which may be randomly selected as the user identifier. If more than one relay node RN1, RN2 replies to the request, the user equipment UE1 or UE2 optionally selects only one RN from the replying nodes or candidates.

In accordance with one, more or all of the embodiments of the invention, an access requesting user equipment, attempted user, may also select two or more, e.g. multiple relay nodes, RNs, to obtain a spatial diversity on request transmission provided that there is no signature collision in these RNs.

2.) When the relay node RN is selected and the AR is successful received by the relay node RN1 or RN2, or the only responding relay node has successful received the access request "Request (ID_U1)" or "Request (ID_U2)", the RN will forward the request to the base station 1 on the random access channel RACH during the random access periods, as shown at step t2, "Access Transmission (ID_U1)" or "Access Transmission (ID_U2)".

This request "Access Transmission (ID_U1)" or "Access Transmission (ID_U1)" optionally also contains an identifier, or information on the identifier, for the attempted user equipment UE1 or UE2. As long as the request is sent, or after the request has been sent to the base station 1 in step t2, the RN may return to a new cycle of idle state.

3.) If the access request AR is correctly detected by the base station 1, an acknowledgment or confirmation message, e.g. ACK, will be sent from the base station 1 to the attempted user 5 or 7 according to the detected user identifier, as shown in step t3, "Access Indicator (ID_U1)" or "Access Indicator (ID_U2)".

In case the access should fail, the user equipment 5, UE1, or 7, UE2, may start the random access trials again.

As shown in FIG. 1, in a relay case, a communication between an access requesting (attempted) user, or user equipment UE1, UE2, or a user terminal, UT, and a relay node 4, 6 is needed before the request is relayed to the base station 1. Therefore, some channel resources are optionally allocated for the users and the relay nodes RNs.

In one or more embodiments, a time division duplex mode such as in a WINNER TDD mode system (WINNER stands for Wireless Initiative New Radio) may be used wherein time slots for communications such as BS-UTs, base station-user terminal, and UT-UT, user terminal-user terminal, communications, are multiplexed by time division multiplex, TDM.

Figure 2:
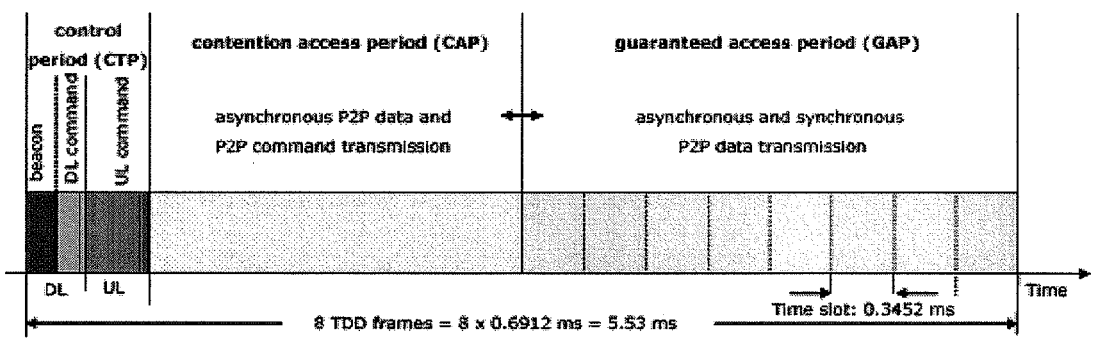
FIG. 2 shows an embodiment of a frame structure for peer-to-peer transmission configured in accordance with an implementation of the invention.

FIG. 2 illustrates an example of a contention-based direct access (transport) channel, DAC, frame structure for peer-to-peer transmission in WINNER. In this frame, a control period, CTP, is used for exchanging medium access control, MAC, control information between the base station BS and user terminals UTs 2, 5, 7. The transmission of the random access toward the BS 1 is launched in the duration of the uplink command "UL command" within the CTP.

As for the communication between the UTs, the contention access period, CAP, is allocated by the system for peer-to-peer communication. The access request AR can be sent to the relay node 4 or 6 in the CAP.

The frame structure of FIG. 2 comprises 8 TDD frames which provide the control period, CTP, the contention access period, CAP, for asynchronous peer to peer data and peer to peer command transmission, and a guaranteed access period, GAP, for asynchronous and synchronous peer to peer data transmission having defined time slots.

One or more embodiments of the invention relate e.g. to the first step in the procedure of the relay based random access, i.e. the handshake between the attempted user and the RNs. The handshake between the user, i.e. the user equipment or user terminal, and the relay node RN may consist of three consecutive phases, i.e. request probing, request response and acknowledgment.

In the following, details of the proposed scheme of communication between the attempted user and the RNs, will be described.

In the phase "request probing", the attempted user broadcasts the access request AR to the neighboring relay nodes RNs. The access request AR optionally contains the information of the selected signature which indicates the user identifier. The purpose of broadcasting the selected signature at the beginning is to let the neighboring RNs check whether the signature is locally unique.

In the phase "request response", when the access request is correctly received, the RNs should firstly judge whether the newly arriving user collides with other nearby users on the selected signature. Note that the candidate RNs can overhear or monitor the signature information of the other neighboring users during one cycle of the contention access period CAP.

Once a signature collision is detected, a collision indicator of signature, CIS, is sent from the relay node to one or more of the colliding users, optionally to the latter user who caused the collision.

Otherwise, if the local uniqueness of the signature is confirmed, the RN optionally replies by sending a response indicating request success, RS.

On the other hand, when the transmissions of the access requests ARs are colliding at the RN, the message of the AR cannot be correctly detected. Therefore, the relay node RN optionally feedbacks or returns a collision indicator of transmission, CIT, to all the colliding users.

Figure 5:
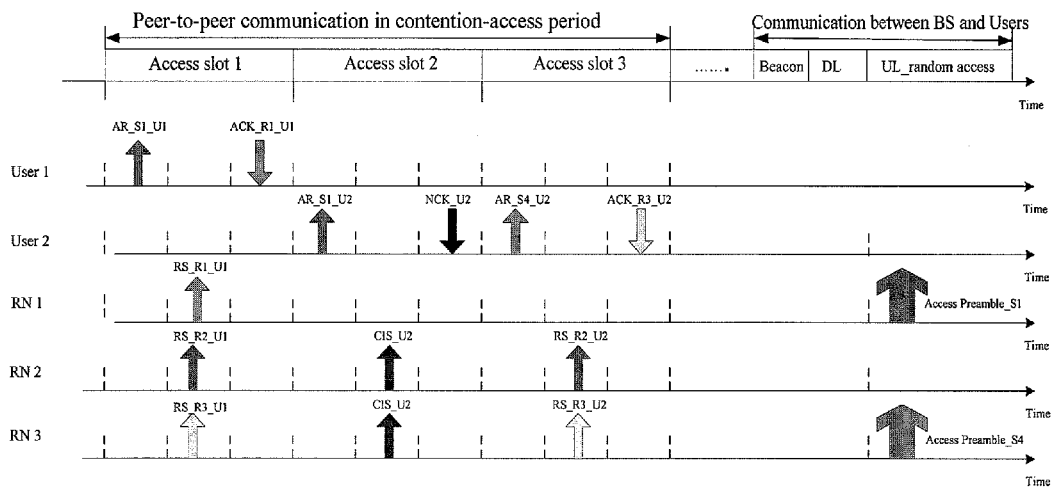
FIG. 5 illustrates a handshake procedure between users and a relay node in case of signature collision in accordance with an embodiment of the invention.

The CIS may be used, needed or sent when the signature collision is detected after one user has successfully sent an access request AR to the RN, as shown in FIG. 5.

Figure 6:
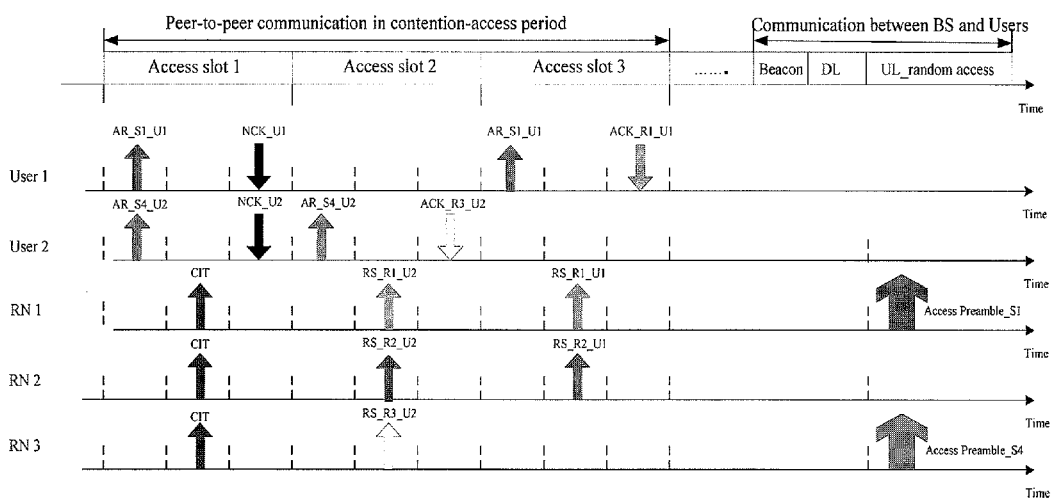
FIG. 6 shows a handshake procedure in case of transmission collision according to an embodiment of the invention.

Comparably, an information on transmission collision, CIT, is sent when one RN hears the access requests ARs from two or more users in one slot, as shown in FIG. 6.

In the request response, the identity of the RN may, in one or more embodiments, only be contained in a "request success" message RS from the relay node to the attempted user. In the proposed protocol according to one or more of the embodiments, the attempted user only needs one RN to forward the AR, so the relay node or the attempted user needs to select one RN. Considering that the real ID of the RN may be very long, and in order to save overhead of the control message, the relay node RN can use a shorter random identity or identifier, ID, as a temporary indicator. The generation of the random ID can be similar to that of the random user ID which may be used in the initial random access.

Furthermore, it should be noted that a collision of a random RN ID is undesired, but such a collision is not as problematic as a user collision at the BS, because the colliding RNs forward the same message if they happen to be selected by the same user. As a result, the only overhead in this collision is the transmit power consumption from the colliding RNs.

The media access scheme of the request response can be time division multiple access TDMA, frequency division multiple access FDMA or code division multiple access CDMA.

Considering the three kinds of responses (signature collision indicator, CIS; request success, RS; transmission collision indicator, CIT) impact differently on the attempted user, one or more embodiments may differentiate the priorities on the three responses, e.g., firstly the CIS, secondly the RS, and finally the CIT. To further improve the detection performances of the responses, many adaptive schemes like bandwidth adaptation can be assigned or used for transmitting the response according to the priorities.

In the following, acknowledgment will be described. An attempted user, i.e. an access requesting user equipment, will wait for a request response after broadcasting the AR. In accordance with one, more or all of the embodiments of the invention, the user equipment firstly detects whether there is a CIS received. If not, then the user equipment detects whether there is a RS received. If neither CIS nor RS is detected, then the user equipment detects whether there is a CIT.

When the CIS is detected, the user equipment is configured to re-select the previously selected signature, and the AR will be broadcasted again by the user equipment in the next access slot, using the reselected signature. Moreover, in the case of signature collision, the attempted user may send a failure information, e.g. a not acknowledged, NCK, in the sub-slot of acknowledgment, to broadcast a failure of the current request, so that the involved RNs can release the information of the current request, as shown in FIG. 5.

If there is no CIS, the attempted user starts to resolve the one or more relay node identities RN IDs in a received request success message RS.

When the attempted user detects more than one RN ID, the user equipment will usually select only one RN to transmit the selected user signature to the BS. As mentioned above, the user equipment may also select two or more relay nodes so that multiple RNs jointly send the AR to the BS so that diversity can be achieved, When the dedicated RN is selected, the attempted user will broadcast a message such as an acknowledgement ACK that contains the message or, or information on, the selected identity of the selected relay node, RN ID. If possible, other message or content can also be conveyed on the acknowledging message, ACK, such as an access cause, priority, bandwidth request, etc, optionally depending on the transmission scheme of the random access in the system, i.e. whether the preamble is separated or combined with the message. In one or more embodiments, for all the RNs, when the acknowledging message such as ACK is received, the signature information of the current request is recorded so a list of valid signatures is updated in the relay nodes.

Meanwhile, the RN ID contained in the received acknowledging message is in one or more embodiments also checked to see whether the RN is selected. If yes, this RN will stop overhearing and be ready to transmit to the base station the preamble that indicates the signature of the attempted user, as shown in FIG. 1. In accordance with an alternative embodiment of the invention, the selected RN may still help to overhear collisions and to send the CIS and CIT to the attempted users. Otherwise or additionally, the relay node is still available for the other users so it continues to overhear, i.e. monitor new request probing. It should be noted that all RNs may reset their records of the signature information when the next periodicity of CAP starts.

If there is neither CIS nor RS, but CIT is detected, the attempted user broadcasts the request again after backoff, as shown in FIG. 6. There are many backoff policies for the retransmission, such as a typical binary exponential, uniform backoff policies and so on. The backoff corresponds to introducing a delay or sending schedule so as to avoid or reduce the possibility of a renewed collision.

If none of the above responses is received, the attempted user broadcasts the AR again without backoff. To further enhance the reliability of the AR transmission, the power can be boosted during the retransmission.

Figure 3:
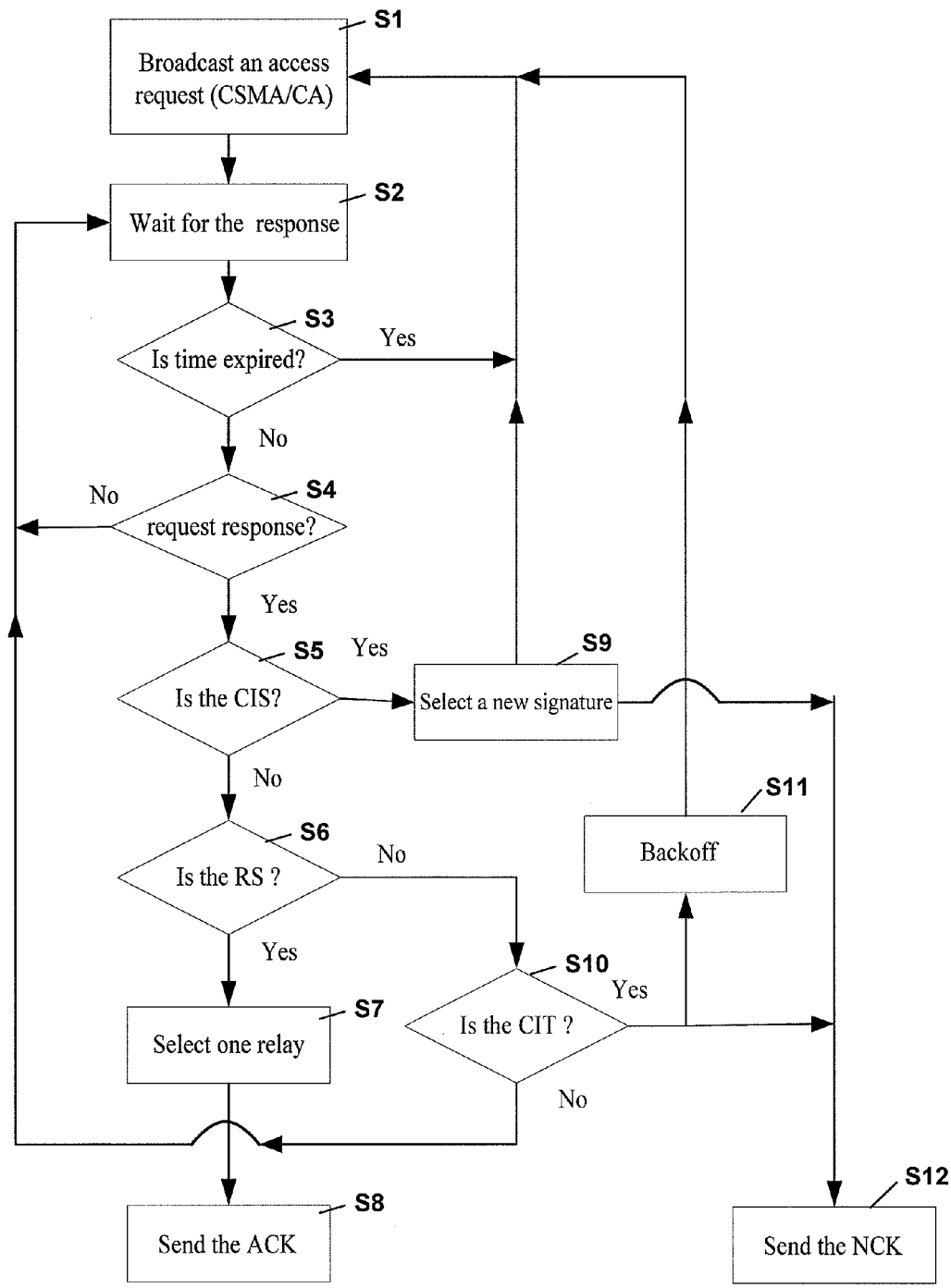
FIG. 3 illustrates a flow chart of a handshake procedure at a user equipment requesting access, according to another embodiment of the invention.
Figure 4:
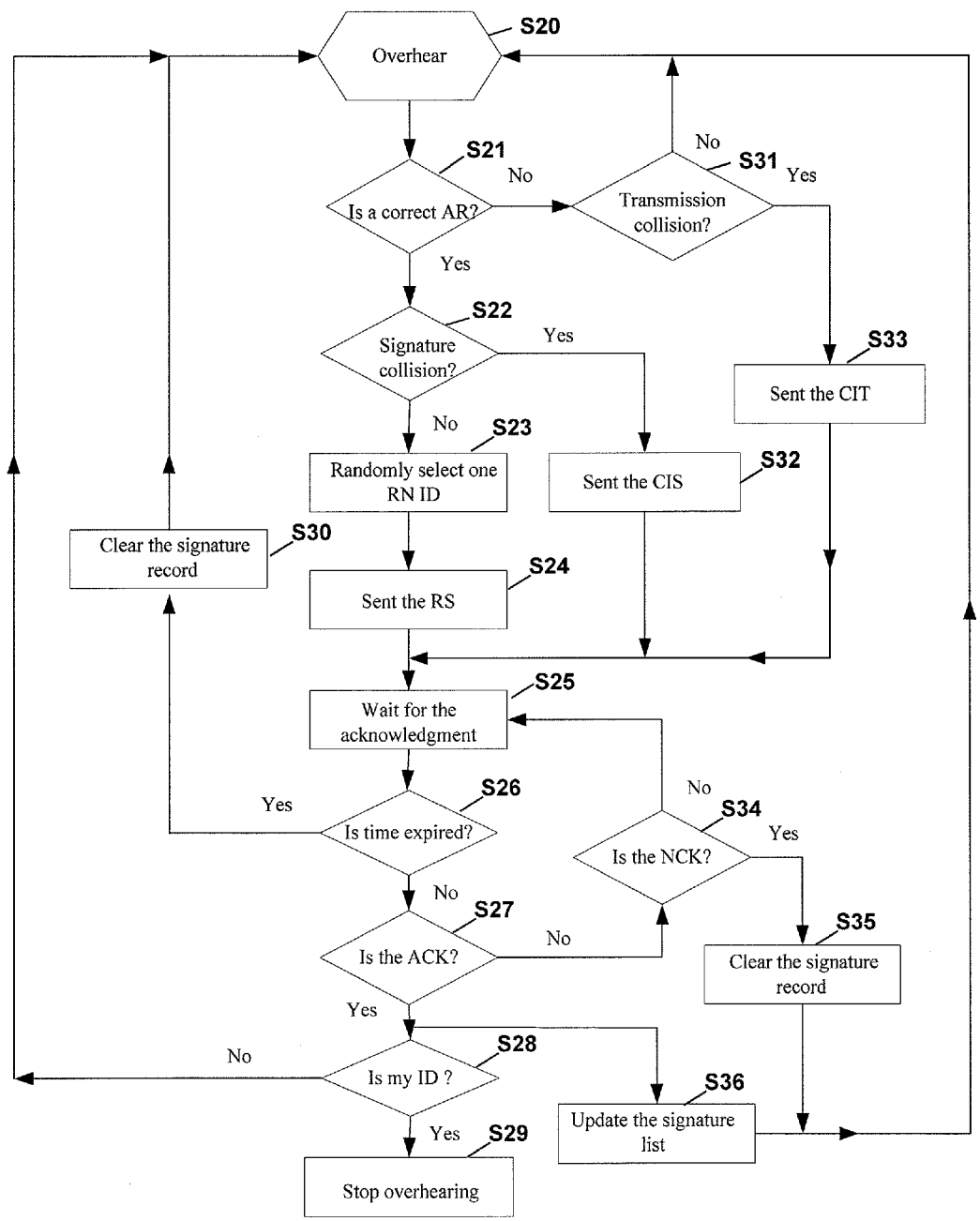
FIG. 4 shows a flow chart of a handshake procedure at a relay node in accordance with an embodiment of the invention.

As a summary, FIG. 3 and FIG. 4 present the procedure of the handshake for the attempted user and the RN, respectively. FIG. 3 shows a flow chart of a handshake procedure at the attempted user.

FIG. 3 illustrates a flow chart of a handshake procedure at a user equipment attempting access to the radio network or base station 1.

As shown in FIG. 3, an attempting user, e.g. a user equipment requesting access, broadcasts an access request, as shown in step S1. The access request may be broadcast according to a protocol providing a collision prevention technique such as CSMA/CA.

In a step S2, the user equipment having broadcast the access request of step S1 waits for a response. A timer is started when broadcasting the access request.

In a step S3, the user equipment checks its timer which has been set for a defined time interval such as e.g. 0.5 sec or arbitrarily for a time between e.g. 0.05 sec and 10 sec. When the timer has not yet expired, the flow proceeds to a step S4. Otherwise, when the timer has expired, the flow loops back to step S1 for newly generating and broadcasting an access request.

In step S4, the user equipment checks whether a request response has been received. If not, the program loops back to step S2, waiting for a response.

When a response has been detected in step S4, the content of the response is checked.

In step S5, the response is first checked regarding an indication of signature collision, CIS.

If a signature collision is indicated, a new signature is selected in step S9, and the program loops back to step S1, generating a new access request based on the selected new signature. In addition, the flow proceeds from step S9 to step S12 sending an access rejection message such as a negative acknowledgement or NCK to the user equipment or relay node.

When the answer of step S5 is no meaning that no signature collision is present, the method or apparatus then checks in step S6 whether a request success is indicated. If yes, a relay node is selected in step S7, and an acceptance or acknowledgement message is sent in step S8.

Otherwise, when in step S6 no request success is indicated, the method or apparatus checks in step S10 whether the received response indicates a transmission collision as indicated by CIT. If no CIT is detected in step S10, the flow loops back to the waiting step S2, waiting for another response.

If step S10 indicates a transmission collision, the procedure proceeds to step S11, performing a backoff procedure for avoiding, or reducing the probability of a collision when generating and broadcasting a next access request. Further, in addition to selecting a backoff procedure, a rejection or negative acknowledgement is sent in step S12.

FIG. 4 illustrates an embodiment of a method, apparatus or flow chart of a handshake at a relay node such as node 4, RN1, or 6, RN2, shown in FIG. 1.

In step S20 of FIG. 4, the relay node starts monitoring receipt or detection of other access requests. When another access request is detected, a step S21 checks whether the request is a correct access request. If the request is a correct access request, the flow checks in step S22 whether a signature collision exists or is indicated. If not, an identifier of the relay node, RN ID, is randomly selected in step S23, and a request success message is sent in step S24.

In step S25, the method, apparatus or flow waits for receipt of an acknowledgement. A timer is started when sending the request success message in step S24. In step S26, the flow checks whether the timer has expired. If yes, a signature record maintained in the relay node is cleared in step S30.

When the timer has not yet expired in step S26, the received message is checked in step S27 regarding whether it is an acknowledgement message. If yes, the program flow proceeds to step S28 in which the content of the acknowledgement message is checked regarding whether or not it is the own identifier of the relay node performing the procedure of FIG. 4.

If not, the program loops back from step S28 to the initial overhearing step S20. In case the own identifier is received in step S28, the process stops the overhearing in step S29.

When the answer of step S21 is no, the program proceeds to a step S31 in which it is checked whether a transmission collision exists or is signalled. If not, the program returns to the overhearing step S20. In case the answer of step S31 is yes, meaning that a transmission collision is detected, the procedure proceeds to a step S33 in which a transmission collision indicator CIT is sent. The process proceeds from step S33 to step S25 waiting for the acknowledgement.

When a signature collision exists or is detected in step S22, a collision indicator such as CIS is sent in step S32, and the process proceeds to step S25.

When the answer of step S27 is no, the flow checks in step S34 whether a rejection or negative acknowledgement such as NCK has been received. If not, the process loops back to step S25, waiting for the acknowledgement. If a rejection or negative acknowledgement is detected in step S34, the routine proceeds to a step S35 in which the signature record of the relay node is cleared, and the process loops back to the overhearing step of S20.

When the answer of decision S27 is yes, and an acknowledgement has been detected, the signature list of the relay node is updated in step S36, and the process loops back to the overhearing step of S20.

FIG. 5 and FIG. 6 exemplify examples of a protocol used in accordance with one, more or all of the embodiments of the invention, where two users and three relay nodes RNs are presented for the sake of simplicity.

FIG. 5 shows an embodiment of a handshake between the users and the RNs in case of signature collision. For example, AR_S1_U1 means the User 1, i.e. user equipment 5, UE1, sends the access request AR with Signature 1; RS_R1_U1 means the relay node 4, RN1, sends a request success message, RS, to User 1, i.e. user equipment 5, UE1; etc.

As shown in FIG. 5, User 1, UE1, sends an access request in access slot 1 of the peer-to-peer communication in the contention-access period, indicating signature S1.

As shown in FIG. 5, in the middle part of access slot 1, three relay nodes RN1, RN2, RN3 send request success messages indicating the signature of UE1.

The UE1 receives an acknowledging response in the third part of access slot 1 from the base station, indicating relay node RN1 selected by the base station.

As shown in access slot 2 of FIG. 5, User 2, UE2, sends an access request in access slot 2 of the peer-to-peer communication in the contention-access period, indicating a signature S1 which has already been used for UE1. The UE2 receives an rejecting or not acknowledging response in access slot 2 due to signature collision, e.g. from relay node R1. In access slot 2 of FIG. 5, in the middle part of access slot 2, two relay nodes RN2, RN3 send collision indicating messages CIS_U2, indicating a signature collision.

In access slot 3, the UE2 again sends an access request but now indicates a newly selected signature S4 for the UE2.

As shown in FIG. 5, in the middle part of access slot 3, two relay nodes RN2, RN3 send request success messages indicating the signature of UE2.

The UE2 now receives an acknowledging response in access slot 3 indicating relay node R3.

FIG. 6 shows an embodiment of a handshake between the users or user equipments and the relay nodes in case of radio access, RA, transmission collision.

Similar to the FIG. 5 embodiment, in FIG. 6, AR_S1_U1 means the User 1, i.e. user equipment 5, UE1, sends the access request AR with Signature 1; RS_R1_U1 means the relay node 4, RN1, sends a request success message, RS, to User 1, i.e. user equipment 5, UE1; etc.

As shown in FIG. 6, both User 1, UE1, and User 2, UE2, send access requests in access slot 1 of the peer-to-peer communication in the contention-access period, the UE1 indicating signature S1, and the UE2 indicating signature S4.

As shown in FIG. 6, in the middle part of access slot 1, three relay nodes RN1, RN2, RN3 detect the transmission collision and send transmission collision indicators CIT. request success messages indicating the signature of UE1.

Both UE1, UE2 receive a rejecting or not acknowledging response in access slot 2 due to transmission collision, e.g. from base station or a relay node.

As shown in access slot 2 of FIG. 6, only User 2, UE2, sends an access request in access slot 2 of the peer-to-peer communication in the contention-access period, indicating again the same signature S4.

As shown in FIG. 6, in the middle part of access slot 2, three relay nodes RN1, RN2, RN3 send request success messages indicating the signature of UE2.

The UE2 now receives an acknowledging response in access slot 2 indicating relay node R3.

As shown in access slot 3 of FIG. 6, User 1, UE1, sends an new access request but now at a different timing as compared with UE2 due to collision prevention strategy. In the embodiment of FIG. 6, the new access request of UE1 is sent in access slot 3 of the peer-to-peer communication in the contention-access period, indicating again its signature S1 which has already been used in the previous access attempt of UE1.

As shown in FIG. 6, in the middle part of access slot 3, two relay nodes RN1, RN2 send request success messages indicating the signature of UE1. The UE1 now receives an acknowledging response in access slot 3 indicating relay node R1.

As shown in the figures, e.g. FIGS. 2, 5, 6, the CAP is divided into multiple access slots for the communication between the users and the RNs. Here, in at least one or more of the embodiments, a downlink synchronization has been achieved before the users launch the initial random access, so all the transmissions are based on slot synchronization.

To avoid a collision on the transmissions among the users, an arbitrary collision prevention or reducing strategy or protocol can be used such as carrier sense multiple access with collision avoidance, CSMA/CA, which is also recommended in WINNER, which can be used as a protocol for the media access control.

In the right hand part of FIGS. 5, 6, the communication between the base station and the user equipments is shown which includes beacon, downlink, and uplink random access sections. As shown, in the uplink random access sections, access preambles are sent to the user equipment of the selected signatures S1, S4.

Different from conventional schemes where collision is resolved only by a base station, embodiments of the invention exploit a new way to prevent user collision by the relay nodes in the relay network.

Figure 7:
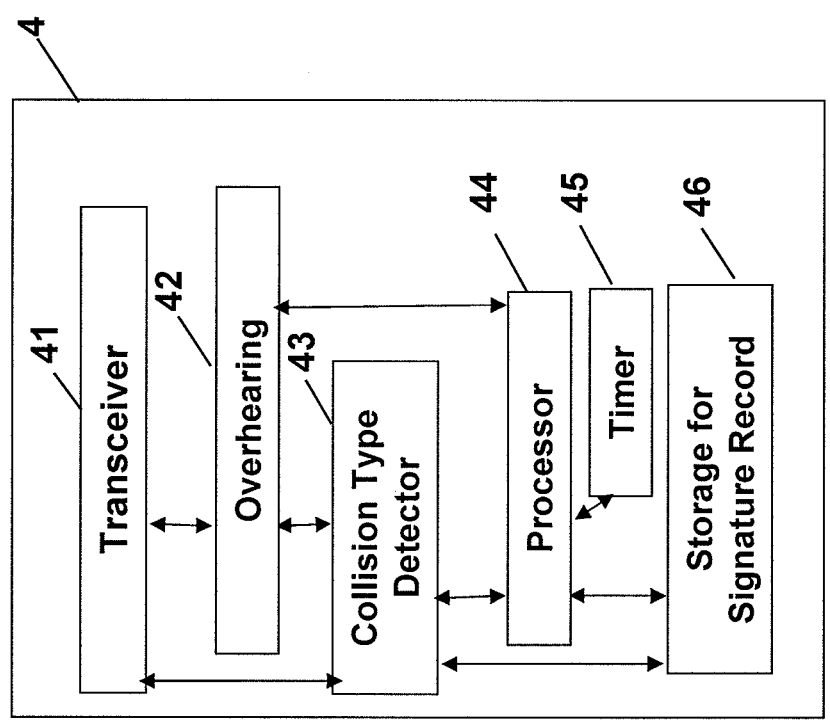
FIG. 7 shows an embodiment of a relay node in accordance with the invention.

FIG. 7 shows an embodiment of a relay node 4 or 6. The relay node 4 or 6 comprises a transceiver 41, an overhearing part or block 42, a collision type detector 43 for detecting at least one of occurrence of a collision and a collision type, a processor 44, a timer 45, and a storage 46 for storing a signature record and/or other type of information.

Figure 8:
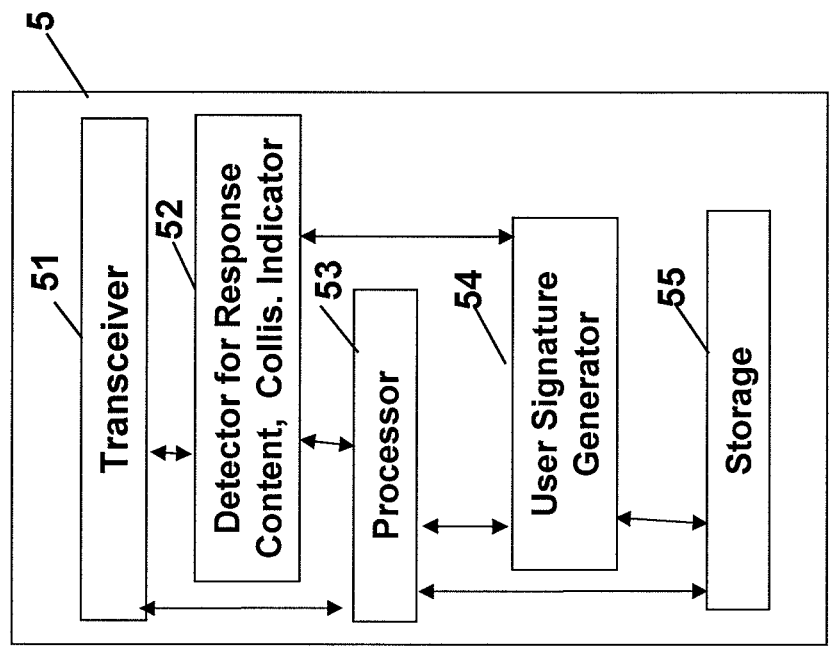
FIG. 8 illustrates an embodiment of a user equipment in accordance with the invention.

FIG. 8 shows an embodiment of a user equipment or terminal 5 or 7 which comprises a transceiver 51, a detector 52 for detecting at least one of a response content and a received collision indicator, a processor 53, a signature generator 54, and a storage 55 for storing information on signatures, operational information and/or the like.

Embodiments of the invention provide at least one or more or all of the following advantages. This list is not limiting or complete, and additional advantages are also achieved.

Since the proposed scheme can avoid a signature collision among neighbouring users, the amount of unnecessary retransmissions for the attempted users or access/relay-requesting terminals can be kept minimal. Therefore, the efficiency of the random access is enhanced, especially when the access needs relaying.

When the relay node detects a potential collision before forwarding the access request AR to the base station BS, a user collision can be detected very early and as soon as possible, so the access delay can be significantly reduced.

A collision is pre-resolved by the local relay nodes RNs, so that the probability of a later user collision at the base station BS is reduced.

According to embodiments, the relay nodes RNs have to send only collision indicators such as CIS and/or CIT to the attempted users in case of collision.

The above described embodiments and proposed protocol uses CIS, RS, and CIT to indicate the different responses from the RNs to the attempted users. Also, the users may respond differently according to the different responses from the RNs.

The proposed protocol is related to coming standards for 3GPP LTE Rel9, IEEE802.16j/m, IMT-Advanced.

In the above embodiments it is not necessary to tackle the collision problem e.g. by limiting the number of simultaneously transmitting users, and randomizing user arriving times by a backoff policy, such as typical binary exponential and uniform backoff policies, creating problems of uncontrollable access delay due to backoff. A further advantage is that a base station does not need to know the number of the colliding users, in particular considering that it is usually difficult for a BS to detect the number of the collided users correctly during the random access. One, more or all embodiments of the invention provide high reliability of collision prevention or resolution.

The architecture shown in the drawings may be implemented using any arbitrary access or radio access technology For the purpose of the present invention as described herein above, it is to be noted that any access or network technology may be used which may be any technology by means of which an apparatus or user equipment can access a network. The user equipments may be terminals of any type such as stationary apparatus, servers, mobile terminals, etc. The network may be any device, unit or means by which a mobile or stationary entity or other user equipment may connect to and/or utilize services offered by the network. Such services may include, among others, data and/or (audio-) visual communication, data download etc.

Generally, the present invention is also applicable in network/terminal environments relying on a data packet based transmission scheme according to which data are transmitted in data packets and which are for example based on the Internet Protocol IP. The present invention is, however, not limited thereto, and any other present or future IP or mobile IP version, or, more generally, a protocol following similar principles is also applicable. The user equipment entity may be any device, unit or means by which a system user may experience services from a network.

The sequence of method steps described above or shown in the drawings can be implemented in any other sequence arbitrarily deviating from the above described or shown sequence of steps. Further, the method, apparatuses and devices, may include only one, more or all of the features described above or shown in the drawings, in any arbitrary combination. The method steps may be implemented as software code portions and be run using a processor at a network element or terminal, can be software code independent, or can be specified using any known or future developed programming language as long as the functionality defined by the method steps is preserved. Generally, any method step is suitable to be implemented as software or by hardware without changing the idea of the present invention in terms of the functionality implemented.

Method steps and/or devices, units or means may be implemented as hardware components at a mobile station or network element or module thereof, may be hardware independent, and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. Devices, units or means (e.g.

User equipment, CSCF) can be implemented as individual devices, units or means, but may also be implemented in a distributed fashion throughout a system, as long as the functionality of the device, unit or means is preserved.

In accordance with one or more of the embodiments of the invention, a computer program product is provided which comprise code means configured to carry out or implement, when run on a processor, one or more or all of the steps or features described above or shown in the drawings, in any arbitrary combination. The computer program product may e.g. be embodied on a computer-readable medium.

The following abbreviations are used above:
AR: Access Request
BS: Base Station
CTP: Control Period
CAP: Contention Access Period
CIS: Collision Indicator of Signature
CIT: Collision Indicator of Transmission
CSMA/CA: Carrier Sense Multiple Access with Collision Avoidance
DAC: Contention-Based Direct Access (Transport) Channel
RN: Relay Node
RS: Request Success
RACH: Random Access Channel
TDM: Time Division Multiplexing
UT: User Terminal

The invention claimed is:

1. An apparatus comprising at least one processor and at least one memory including computer program code, the at least one memory and the computer program code being configured, with the at least one processor, to cause the apparatus to perform at least the following:
   first, broadcast an access request message to a plurality of relay nodes, wherein the access request message comprises signature information indicating a user identifier;
   check whether a collision indicator is received from a relay node of the plurality of relay nodes;
   check whether the collision indicator is a transmission collision indicator and broadcast the access request message again after a backoff or delay time in case of transmission collision;
   check whether the collision indicator is a signature collision indicator and re-select a signature information and broadcast another access request comprising the reselected signature information in case of signature collision;
   broadcast the access request again without backoff or delay time in case no response is received to the access request message, and increase transmission power during the retransmission;
   next, receive a response message from at least two relay nodes of the plurality of relay nodes, wherein the response message comprises a relay node identifier;
   next, select one relay node out of the at least two relay nodes; and
   then, broadcast another response message to the plurality of relay nodes, wherein the other response message comprises the relay node identifier of the selected relay node.

2. The apparatus of claim 1,
   wherein the apparatus is configured as a user equipment, mobile node, terminal, or a part, chip, module, software of or for a user equipment.

3. The apparatus of claim 1, further comprising detecting a collision indicator from at least one of the plurality of relay nodes, wherein the collision indicator is at least one of:
   a signature collision indicator, received from the node in case of colliding users,
   a signature collision indicator received after the apparatus the access request has successfully been sent to the node, and
   a collision indicator of transmission received when transmissions of access requests are colliding at the node.

4. The apparatus of claim 1, wherein the apparatus is configured to select a node in case response messages are received from more than one node in response to the access request.

5. The apparatus of claim 1, wherein the apparatus is configured to generate signature information on a random basis.

6. The apparatus of claim 1, wherein the apparatus is configured to:
   detect a collision indicator received from at least one of the plurality of relay nodes,
   check whether the received collision indicator is a signature collision indicator,
   then check whether the received response is a request success response, and
   then check whether the collision indicator is a transmission collision indicator, a response generated by the apparatus depending on the received response.

7. The apparatus of claim 1, wherein the apparatus is configured to perform at least one of:
   in case of signature collision, send a failure information,
   send additional content such as an access cause, priority, bandwidth request,
   send a preamble separated from a message, and
   send a preamble combined with the message.

8. An apparatus comprising at least one processor and at least one memory including computer program code, the at least one memory and the computer program code being configured, with the at least one processor, to cause the apparatus to perform at least the following:
   first, receive at least one access request message from at least one user equipment, wherein the access request message comprises signature information indicating a user identifier;
   check whether a transmission collision exists;
   when a transmission collision is detected, send a transmission collision indicator to the user equipment;
   check whether a signature collision exists;
   when a signature collision is detected, send a signature collision indicator to the user equipment;
   next, broadcast a response message to the user equipment, wherein the response message comprises a relay node identifier;
   next, receive another response message from the user equipment, wherein the other response message comprises the relay node identifier; and
   then, broadcast another access request message to a base station, wherein the other access request message comprises the user identifier and wherein the base station determines whether access to the network shall be granted for the apparatus, at least in part based on the other access request message.

9. The apparatus of claim 8, wherein the apparatus is a relay node, or a part, chip, module, software of or for a relay node.

10. The apparatus of claim 8, wherein the apparatus is configured to perform at least one of:
    monitoring receipt or detection of at least one other access request,
    checking whether a type of collision such as signature collision,
    selecting an identifier of the apparatus, selecting an identifier of the apparatus on a random basis,
sending the identifier to the user equipment,
starting a timer when sending a request success message,
clearing a signature record maintained in the apparatus when the timer has expired,
clearing the signature record of the apparatus,
returning to the monitoring of receipt or detection of at least one other access request,
updating the signature record by including information on the user equipment when detecting an acknowledgement.

11. A method comprising:
first, broadcasting an access request message to a plurality of relay nodes by an apparatus, the access request message comprising signature information indicating a user identifier;
check whether a collision indicator is received from a relay node of the plurality of relay nodes;
check whether the collision indicator is a transmission collision indicator and broadcast the access request message again after a backoff or delay time in case of transmission collision;
check whether the collision indicator is a signature collision indicator and re-select a signature information and broadcast another access request comprising the reselected signature information in case of signature collision;
broadcast the access request again without backoff or delay time in case no response is received to the access request message, and increase transmission power during the retransmission;
next, receiving a response message from at least two relay nodes of the plurality of relay nodes by the apparatus, wherein the response message comprises a relay node identifier;
next, selecting one relay node by the apparatus out of the at least two relay nodes; and
then, broadcasting another response message by the apparatus to the plurality of relay nodes, wherein the other response message comprises the relay node identifier of the selected relay node.

12. The method of claim 11, further comprising:
detecting a collision indicator by the apparatus received from the node,
checking the received collision indicator by the apparatus, and
sending another access request by the apparatus depending on the received collision indicator
wherein the collision indicator is at least one of:
a signature collision indicator, received from the node in case of colliding users, and
a signature collision indicator received after the access request has successfully been sent to the node,
a collision indicator of transmission received when transmissions of access requests are colliding at the node.

13. The method of claim 11, comprising at least one of:
select a node in case response messages are received from more than one node in response to the access request;
generate a signature information on a random basis;
first check whether a received collision indicator is a signature collision indicator,
then check whether the received response is a request success response, and
then check whether the collision indicator is a transmission collision indicator, a response generated by the apparatus depending on the received response.

14. The method of claim 11, comprising at least one of:
in case of signature collision, send a failure information;
select a node when a response received includes more than one node identifiers of two or more nodes,
broadcast a message containing information on the selected node,
send additional content such as an access cause, priority, bandwidth request,
send a preamble separated from a message, and
send a preamble combined with the message.

15. A method, comprising:
first, receiving, by a node, at least one access request message from at least one user equipment, wherein the access request message comprises a user identifier;
check whether a transmission collision exists;
when a transmission collision is detected, send a transmission collision indicator to the user equipment;
check whether a signature collision exists;
when a signature collision is detected, send a signature collision indicator to the user equipment;
next, broadcasting a response message to the user equipment, wherein the response message comprises a relay node identifier;
next, receiving another response message from the user equipment, wherein the other response message comprises the relay node identifier; and
then, broadcasting another access request message to a base station, wherein the other access request message comprises the user identifier.

16. The method of claim 15, comprising at least one of:
monitoring receipt or detection of at least one other access request message,
checking a type of collision such as signature collision,
selecting an identifier,
selecting an identifier on a random basis,
sending the identifier to the user equipment,
sending a request success message to the user equipment,
starting a timer when sending the request success message,
clearing a signature record when the timer has expired,
clearing the signature record,
returning to the monitoring of receipt or detection of at least one other access request,
updating the signature record by including information on the user equipment when detecting an acknowledgement.

17. A computer program product embodied on a non-transitory computer-readable medium, in which a computer program is stored, that, when being executed by a computer, is configured to provide instructions for carrying out at least the following:
first, broadcasting an access request message to a plurality of relay nodes by an apparatus, the access request message comprising signature information indicating a user identifier;
check whether a collision indicator is received from a relay node of the plurality of relay nodes;
check whether the collision indicator is a transmission collision indicator and broadcast the access request message again after a backoff or delay time in case of transmission collision;
check whether the collision indicator is a signature collision indicator and re-select a signature information and broadcast another access request comprising the reselected signature information in case of signature collision;

broadcast the access request again without backoff or delay time in case no response is received to the access request message, and increase transmission power during the retransmission;

next, receiving a response message from at least two relay nodes of the plurality of relay nodes by the apparatus, wherein the response message comprises a relay node identifier;

next, selecting one relay node by the apparatus out of the at least two relay nodes; and then, broadcasting another response message by the apparatus to the plurality of relay nodes, wherein the other response message comprises the relay node identifier of the selected relay node.

* * * * *